United States Patent
Wei et al.

(10) Patent No.: US 11,692,150 B2
(45) Date of Patent: Jul. 4, 2023

(54) HALOGEN-CONTAINING SYNTHETIC BASE OILS, AND PREPARATION METHOD AND USE THEREOF

(71) Applicant: APALENE TECHNOLOGY CO., LTD. (HANGZHOU), Hangzhou (CN)

(72) Inventors: Dongchu Wei, Hangzhou (CN); Binbin Liu, Hangzhou (CN); Bing Li, Hangzhou (CN)

( * ) Notice: Subject to any disclaimer, the term of this patent is extended or adjusted under 35 U.S.C. 154(b) by 0 days.

(21) Appl. No.: 16/873,008

(22) PCT Filed: Aug. 1, 2018

(86) PCT No.: PCT/CN2018/000283
§ 371 (c)(1),
(2) Date: Jan. 15, 2020

(87) PCT Pub. No.: WO2019/213791
PCT Pub. Date: Nov. 14, 2019

(65) Prior Publication Data
US 2021/0189277 A1 Jun. 24, 2021

(30) Foreign Application Priority Data
May 9, 2018 (CN) .......................... 201810436572.2

(51) Int. Cl.
*C10M 107/38* (2006.01)
*C08F 110/02* (2006.01)
(Continued)

(52) U.S. Cl.
CPC ......... *C10M 107/38* (2013.01); *C08F 110/02* (2013.01); *C08F 110/14* (2013.01);
(Continued)

(58) Field of Classification Search
CPC .......................... C10M 107/38; C10M 147/02; C10M 177/00; C10M 2223/041; C10M 2207/026; C10M 2213/0606; C10M 2213/023; C10M 2207/285; C10M 2203/06; C10M 2215/064; C10M 2205/0285; C10M 2205/0225; C10M 2205/0245; C10M 2205/0265; C08F 110/14; C08F 8/18;
(Continued)

(56) References Cited

U.S. PATENT DOCUMENTS

| | | | | |
|---|---|---|---|---|
| 3,081,294 A | * | 3/1963 | Beynon | C10M 107/10 568/74 |
| 2004/0220320 A1 | * | 11/2004 | Abhari | C08F 10/06 524/487 |
| 2014/0088267 A1 | * | 3/2014 | Ng | C08F 8/20 525/334.1 |

* cited by examiner

*Primary Examiner* — Vishal V Vasisth
(74) *Attorney, Agent, or Firm* — Panterrain IP Law; Charles Liu

(57) ABSTRACT

The present invention provides a class of halogen-containing synthetic base oils, and preparation method and use thereof. The synthetic base oils have introduced with halogen, especially fluorine, wherein the dipole motion of the halogen groups results in dipole interaction between the dipoles of other components and the base oil molecules of dipole-dipole and dipole-induced halogen (especially fluorine), and the interaction force is stronger and more localized than the dispersion force between the molecules of pure hydrocarbon synthetic oils, and thus the performance of the base oils is directly affected. It solved the problem of oil solubility of pure hydrocarbon synthetic oils, and also improved the properties of oxidation resistance and thermal stability.

5 Claims, 1 Drawing Sheet

(51) Int. Cl.
 *C08F 110/14* (2006.01)
 *C10N 20/00* (2006.01)
 *C10N 30/00* (2006.01)
 *C10N 20/04* (2006.01)
(52) U.S. Cl.
 CPC ... *C08F 2810/00* (2013.01); *C10M 2213/023* (2013.01); *C10N 2020/04* (2013.01); *C10N 2020/09* (2020.05); *C10N 2030/26* (2020.05)
(58) Field of Classification Search
 CPC ...... C08F 8/04; C08F 110/02; C08F 2810/00; C10N 2040/25; C10N 2020/09; C10N 2030/26; C10N 2030/24; C10N 2050/10; C10N 2040/04; C10N 2020/04; C10N 2060/08
 See application file for complete search history.

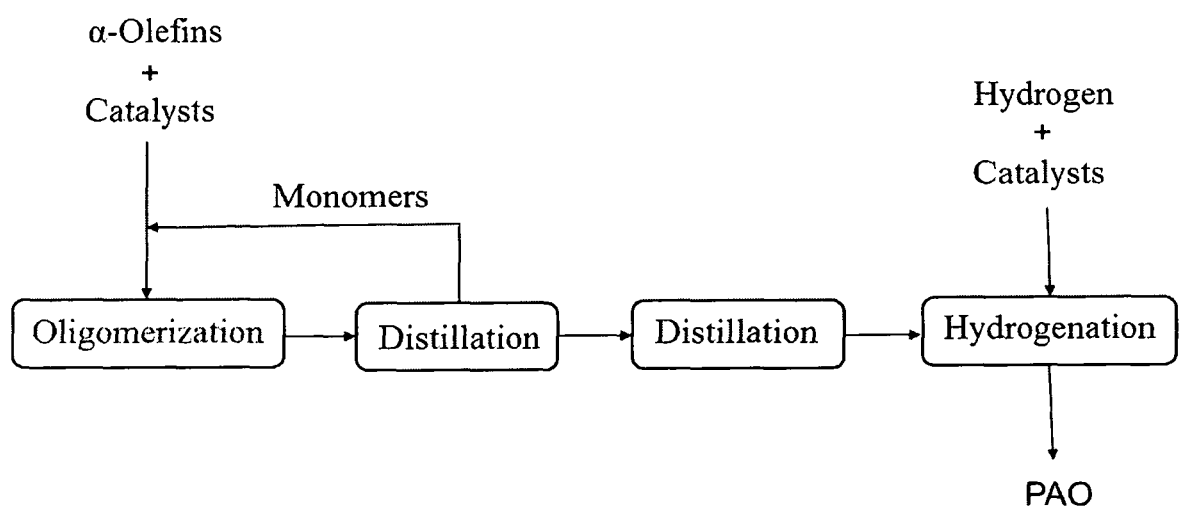

HALOGEN-CONTAINING SYNTHETIC BASE OILS, AND PREPARATION METHOD AND USE THEREOF

This application is a 371 of PCT/CN2018/000283, filed Aug. 1, 2018.

FIELD OF THE INVENTION

The present invention relates to a new type of halogen-containing synthetic base oil for formulating lubricating oil, especially a fluorine-containing synthetic base oil.

BACKGROUND OF THE INVENTION

A synthetic base oil produced by the polymerization of ethylene, propylene, butene, isobutylene, an α-olefin monomer, or a mixture thereof, or a combination of any one or more of the above, can be used as a base oil for formulating lubricating oil or base oil performance improver with excellent properties. Such synthetic base oil is currently one of the most widely used base oils for synthetic engine oils, gear oils and other industrial oils and greases. The synthetic oils prepared by the synthetic base oil greatly expand the applications of lubricating greases at high temperatures, low temperatures, high load, and other severe conditions, and provide excellent viscosity-temperature performance, thermal oxidation stability, lubrication and anti-wear performance and cleanliness, and thus greatly extend the oil-changing period, alleviate equipment corrosion and wear, reduce the maintenance cycle, and utilization efficiency and service life of the equipment with great economic benefits for the users and great social benefits for environmental protection and energy conservation. Therefore, the synthetic base oil has been generally preferred as the base oil of lubricating oil in many of today's most premium lubricant products.

Exxon Mobil is one of the world's major companies producing synthetic base oils. In the 1980s, it launched a new generation of poly-α-olefin (PAO) synthetic base oils synthesized using α-olefins. Such new PAO base oil generally has a prominent backbone from which PAO molecules extend. Its molecular structure can be briefly expressed as the formula showing below. With such unique geometric structure, a very uniform chemical product can be provided with a comb-like structure and with no vertical side chains. In comparison with conventional mineral oils, this shape improves rheological and flow characteristics, and provides better shear stability, lower pour point, and higher viscosity index especially due to its less side chains. These characteristics are important for the mineral oils in high-grade applications, including oils for power transmission system and gears, lubricating oils for compressor, transmission fluids, and industrial lubricants.

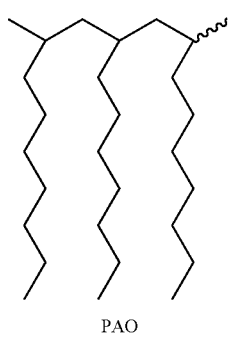

PAO

The current manufacturing process for synthetic base oil PAO mainly includes: α-olefin polymerization, catalytic hydrogenation, fractional distillation to obtain the products of the synthetic base oil PAO, as shown in the scheme below.

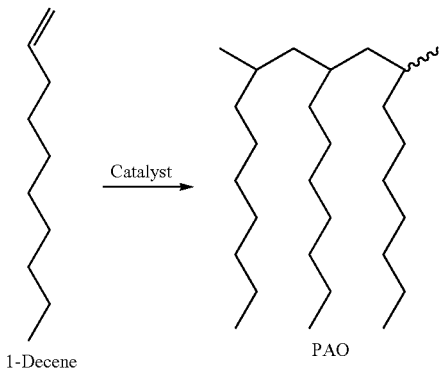

1-Decene       PAO

The manufacturing process to synthesize mPAO mainly includes: the step one for polymerization, and the second step for hydrogenation to obtain mPAO products, as shown in the flowchart of FIG. 1.

Poly-α-olefins obtained by polymerization of α-olefins contain unsaturated double bonds which are susceptible to oxidation, and further hydrogenation reactions are required. How to deal with terminal double bonds to have more stable products is the subject of our research.

SUMMARY OF THE INVENTION

In view of the existing problems in the synthesis of poly-α-olefins, the present inventors have verified through experiments that halogen atoms, especially fluorine atoms, can be introduced into terminal double bonds or other double bonds, thereby increasing the polarity of the poly-α-olefins, improve their compatibility with other additives, improving the oxidation resistance and thermal stability of synthetic base oils, and further increasing the resistance to high temperature, corrosion, radiation, wear and so on.

For example, the molecular structure of the synthetic base oils, which are formed by addition of halogen atoms and particularly fluorine atoms to the terminal double bonds or other double bonds of the ethylene-polymerized multi-branched polyethylene, is shown in the following scheme.

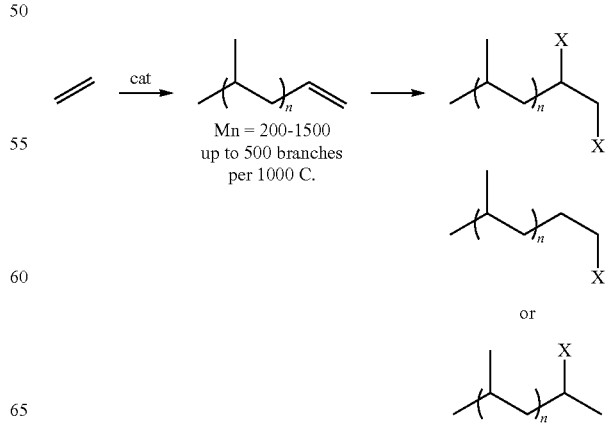

Mn = 200-1500
up to 500 branches per 1000 C.

The present invention provides a new type of halogen-containing synthetic base oil for formulating lubricating oil, especially afluorine-containing synthetic base oil, method of manufacture and use thereof.

In one aspect, the present invention provides a new type of halogen-containing synthetic base oils, wherein, the synthetic products are prepared by:

Adding halogen, especially fluorine, at terminal double bonds or other double bonds of the poly-α-olefins, adding halogen, especially fluorine, at terminal double bonds or other double bonds of the polymer of monomeric α-olefins or mixed α-olefins, adding halogen, especially fluorine, at terminal double bonds or other double bonds of the multi-branched polyethylene polymerized from ethylene, adding halogen, especially fluorine, at terminal double bonds or other double bonds of the copolymer of ethylene and propylene, adding halogen, especially fluorine, at terminal double bonds or other double bonds of the copolymer of ethylene and α-olefin, or adding halogen, especially fluorine, at terminal double bonds or other double bonds of the polymer of isobutylene.

The synthetic base oils contain synthetic products, FF-PAO and/or F-PAO, having structure and process of synthesis as follows:

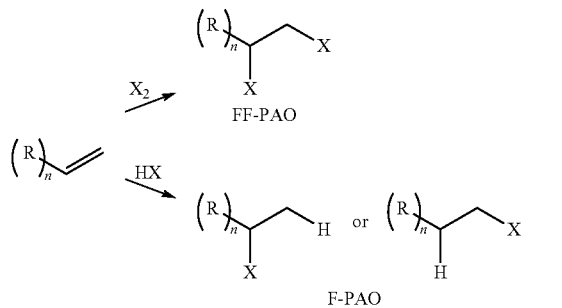

wherein:
molecular weight of the synthetic products, FF-PAO or F-PAO, is 100-20000;
X is halogen;
n is an integer of 2-30;
R is selected from the groups consisting of:
1) a group of poly-α-olefins with a chain length of 4-20, having a molecular weight of 100-20000,
2) a group of polymer of monomeric α-olefins with a chain length of 4-20 or of mixed α-olefins with a chain length of 4-20, having a molecular weight of 100-20000,
3) a group of multi-branched polyethylene polymerized from ethylene, having a molecular weight of 100-20000,
4) a group of copolymer of ethylene and propylene, having a molecular weight of 100-20000,
5) a group of copolymer of ethylene and α-olefin with a chain length of 4-20, having a molecular weight of 100-20000, and
7) a group of polymer of isobutylene, having a molecular weight of 100-20000;
The halogen in the synthetic base oils can be fluorine, chlorine, bromine or iodine. Preferably, the halogen is fluorine.

In the synthetic base oils, n is an integer of 2-10, or of 2-10 plus an integer for a copolymer;

In the synthetic base oils, n is an integer of 2-30, or of 2-20 plus an integer for a copolymer When the halogen is fluorine, the structure and preparation method of the base oils are as follows:

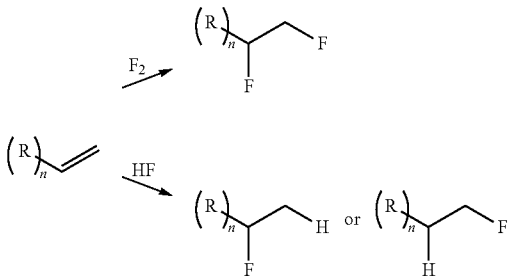

wherein, n is an integer of 2-30; the synthetic base oils generally have a molecular weight of 100-20,000;
R is selected from the groups consisting of:
1) a group of poly-a-olefins with a chain length of 4-20, having a molecular weight of 100-20000,
2) a group of polymer of monomeric α-olefins with a chain length of 4-20 or of mixed α-olefins with a chain length of 4-20, having a molecular weight of 100-20000,
3) a group of multi-branched polyethylene polymerized from ethylene, having a molecular weight of 100-20000,
4) a group of copolymer of ethylene and propylene, having a molecular weight of 100-20000,
5) a group of copolymer of ethylene and α-olefin with a chain length of 4-20, having a molecular weight of 100-20000, and
7) a group of polymer of isobutylene, having a molecular weight of 100-20000.

In another aspect, the present invention provides a method of preparing the halogen-containing synthetic base oils. The method includes the following process:

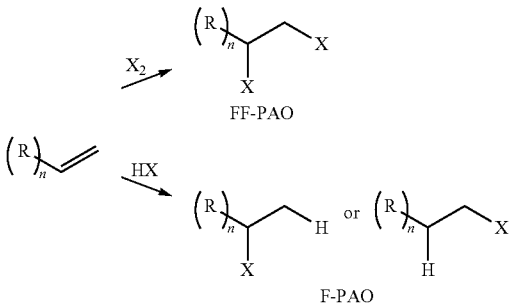

wherein:
molecular weight of the synthetic products, FF-PAO or F-PAO, is 100-20000;
X is halogen;
n is an integer of 2-30;
R is selected from the groups consisting of:
1) a group of poly-α-olefins with a chain length of 4-20, having a molecular weight of 100-20000,
2) a group of polymer of monomeric α-olefins with a chain length of 4-20 or of mixed α-olefins with a chain length of 4-20, having a molecular weight of 100-20000,
3) a group of multi-branched polyethylene polymerized from ethylene, having a molecular weight of 100-20000, 4) a group of copolymer of ethylene and propylene, having a molecular weight of 100-20000, 5) a group of copolymer of ethylene and α-olefin with a chain length of 4-20, having a molecular weight of 100-20000, and 7) a group of polymer of isobutylene, having a molecular weight of 100-20000; wherein, the preparation of the synthetic products includes:

Adding halogen at terminal double bonds or other double bonds of the poly-α-olefins, adding halogen at terminal double bonds or other double bonds of the polymer of monomeric α-olefins or mixed α-olefins, adding halogen at terminal double bonds or other double bonds of the multi-branched polyethylene polymerized from ethylene, adding halogen at terminal double bonds or other double bonds of the copolymer of ethylene and propylene, adding halogen at terminal double bonds or other double bonds of the copolymer of ethylene and α-olefin, or adding halogen at terminal double bonds or other double bonds of the polymer of isobutylene.

In the preparation, the halogen can be fluorine, chlorine, bromine or iodine. Preferably, the halogen is fluorine.

Depending on the electrophilic reaction conditions, resulting products are different as follows:

1) when halogen is used, the resulting products are double halogen substituted products, FF-PAO, from halogenating addition at terminal and alpha and non-terminal double bonds;

2) when hydrogen halide is used, the resulting products are single halogen substituted products, F-PAO, from halogenating addition at alpha and beta positions and non-terminal double bonds.

In yet another aspect, the present invention provides a use of the halogen-containing synthetic base oils for formulating lubricating oil, which comprises mixing the synthetic base oils and additives to form a composition to be used as a lubricating oil.

The synthetic base oils herein have introduced halogen, especially fluorine atoms, wherein the dipole motion of the halogen groups results in dipole interaction between the dipoles of other components and the base oil molecules of dipole-dipole and dipole-induced halogen (especially fluorine), and the interaction force is stronger and more localized than the dispersion force between the molecules of pure hydrocarbon synthetic oils, and thus the performance of the base oils is directly affected. The halogenated, especially fluorinated synthetic base oils, as described herein, similar to synthetic ester-based oils, have increased polarity, which solved the problem of oil solubility of pure hydrocarbon synthetic oils, and are substantially soluble with other lubricating additives; and also enhanced the oxidation resistance and thermal stability for resistance of such as high temperature, water, corrosion and radiation. The synthetic base oils of the present invention can be widely used in transmission equipment in fire protection, railway, atomic energy, aerospace, electronics, electrical, chemical, machinery, instrumental, construction, textile and other industries.

BRIEF DESCRIPTION OF THE DRAWINGS

FIG. 1 is a flowchart illustrating a production process of synthetic mPAO.

DETAILED DESCRIPTION OF THE EMBODIMENTS

Example 1. Synthesis of Poly-α-Decene FF-PAO6

Poly-α-decene is prepared from decene-1 through a catalytic polymerization reaction. In a Teflon vessel was placed with a mixture of 200 mg of poly-α-decene and 2 mL of dichloromethane, and a solution of 200 mg of difluoroiodo-p-toluene in $Et_3N$-$THF$-$CH_2Cl_2$ (1:1:2) was added dropwise at −78° C. After the addition was completed, the temperature was raised to 0° C. for 2 hours. The reaction solution was then poured into aqueous saturated sodium bicarbonate. The materials were washed three times with ether and the solvent was evaporated to dryness. The resulting materials were subjected to molecular distillation to obtain 150 mg of FF-PAO6. IR (neat): 1730 $cm^{-1}$, $^{19}F$ NMR (376 MHz, $CDCl_3$): δ −189.64-198.23 (m, 1F), −230.24, −230.58 (m, 1F).

Example 2. Synthesis of Poly-α-Decene F-PAO6

Poly-αdecene is prepared from decene-1 through catalytic polymerization. In a Teflon vessel was placed with 200 mg of poly-α-decene and cooled to −20-30° C., and a 10 mL solution of HF in dimethyl ether was added dropwise. After the addition was completed, the reaction was warmed to room temperature for 3 hours and then quench with ice water. The materials were extracted three times with dichloromethane, and the solvent was distilled off. The resulting materials were subjected to molecular distillation to obtain 130 mg of F-PAO6. IR (neat): 1730 $cm^{-1}$, $^{19}F$ NMR (376 MHz, $CDCl_3$): δ −172 (m, 1F).

Example 3. Synthesis of Multi-Branched Polyethylene FF-PEO100

Multi-branched polyethylene is prepared via catalytic polymerization of ethylene. In a Teflon vessel was placed with a mixed solution of 200 mg of multi-branched polyethylene and 2 mL of dichloromethane, and a solution of 200 mg of difluoroiodo-p-toluene in $Et_3N$-$THF$-$CH2Cl2$ (1:1:2) was added dropwise at −78° C. After the dropwise addition was completed, the temperature was raised to 0° C. for 2 hours. The reaction was then poured into aqueous saturated sodium bicarbonate. The materials were washed three times with ether, and the solvent was evaporated to dryness. The resulting materials were then subjected to molecular distillation to obtain 165 mg of FF-PEO100. IR (neat): 1728 $cm^{-1}$, $^{19}F$ NMR (376 MHz, $CDCl_3$): δ −188.94-196.43 (m, 1F), −228.24, −228.58 (m, 1F).

Example 4. Synthesis of Multi-Branched Polyethylene F-PEO100

Multi-branched polyethylene is prepared via catalytic polymerization of ethylene. In a Teflon vessel was placed with 200 mg of multi-branched polyethylene, the mixture was cooled to −20-30° C., and 10 mL solution of HF in dimethyl ether as added dropwise. After addition was completed, the temperature was raised to room temperature for 3 hours, and then the reaction was quenched with ice water.

The materials were extracted three times with dichloromethane, and the solvent was distilled off. The resulting materials were molecularly distilled to obtain 132 mg of F-PEO100. IR (neat): 1728 cm$^{-1}$, $^{19}$F NMR (376 MHz, CDCl$_3$): δ −170 (m, 1F).

Example 5. Base Oil Blending Test of FF-PAO6 and F-PAO6

The test results of FF-PAO6 and F-PAO6 base oil blending and testing are shown in Table 1.

TABLE 1

Base oil blending samples and test results for FF-PAO6 and F-PAO6

| Composition Blending sample | Synthetic base oil, wt % | | | Alkyl compd, wt % Alkyl naphthalene, 100° C. 5 cst | Dispersant, wt % Dioctyl phthalate | Total, wt % |
|---|---|---|---|---|---|---|
| | PAO6 | FF-PAO6 | F-PAO6 | | | |
| 1 | 84 | | | 10 | 6 | 100 |
| 2 | 94 | | | 0 | 6 | 100 |
| 3 | 94 | | | 6 | 0 | 100 |
| 4 | | 84 | | 10 | 6 | 100 |
| 5 | | 94 | | 0 | 6 | 100 |
| 6 | | 94 | | 6 | 0 | 100 |
| 7 | | | 84 | 10 | 6 | 100 |
| 8 | | | 94 | 0 | 6 | 100 |
| 9 | | | 94 | 6 | 0 | 100 |

Notes:
(1) PAO6 is a commercially available ordinary PAO product;
(2) FF-PAO6 and F-PAO6 are PAO products with double substitution and single substitution of F, as prepared in the present invention.

The base oils were blended according to the mixing ratios shown in the Table 1 above, and then mixed with the following additives, respectively, to obtain a formula-type lubricating oil composition:

(1) 0.4 wt % hindered phenol and diphenylamine antioxidants, with a feed ratio of 1:1;

(2) 1.5 wt % butylated triphenyl phosphate antifriction agent;

(3) 0.1 wt % ashless rust inhibitor.

The composition was left at 100° C. for 16 weeks, in which the blending test samples 1, 4, 5, 6, 7, 8, 9 shown no turbidity and precipitation, which indicates that the products FF-PAO6 and F-PAO6 effectively improve the solubility and dispersibility of the three types of functional additives in lubricating oil compositions.

The blending test samples 2 and 3 showed trace turbidity and moderate flocculation. The appearance of turbidity and flocculation indicates insoluble phenomenon of the additives in the lubricating oil composition.

Through the anti-emulsification test of ASTM-D1401 for the above blending test samples, it was found that the lubricating oil composition prepared with FF-PAO6 and F-PAO6 can be completely separated from water within 8 minutes (in the formulation of the test sample apparently there is no demulsifier). This shows that the fluorinated PAO prepared by the method of the present invention has improved water separation property.

Example 6. Base Oil Blending Test of FF-PEO100 and F-PEO100

The results of blending test of FF-PEO100 and F-PEO100 base oil are shown in Table 2.

TABLE 2

Base oil blending samples and test results for FF-PEO100 and F-PEO100

| Composition Blending sample | Synthetic base oil, wt % | | | Alkyl compd, wt % Alkyl naphthalene 100° C. 5 cst | Dispersant, wt % Dioctyl phthalate | Total, wt % |
|---|---|---|---|---|---|---|
| | PEO100 | FF-PEO100 | F-PEO100 | | | |
| 1 | 85 | | | 10 | 5 | 100 |
| 2 | 95 | | | 0 | 5 | 100 |
| 3 | 95 | | | 5 | 0 | 100 |
| 4 | | 85 | | 10 | 5 | 100 |
| 5 | | 95 | | 0 | 5 | 100 |
| 6 | | 95 | | 5 | 0 | 100 |
| 7 | | | 85 | 10 | 5 | 100 |
| 8 | | | 95 | 0 | 5 | 100 |
| 9 | | | 95 | 5 | 0 | 100 |

Notes:
(1) PEO100 is a commercially available ordinary PEO product;
(2) FF-PEO100 and F-PEO100 are PEO products with double substitution and single substitution of F, as synthesized in the present invention.

The base oils were blended according to the mixing ratios shown in the Table 1 above, and then mixed with the following additives, respectively, to obtain a formula-type lubricating oil composition:

(1) 0.4 wt % hindered phenol and diphenylamine antioxidants, with a feed ratio of 1:1;

(2) 1.5 wt % butylated triphenyl phosphate antifriction agent;

(3) 0.1 wt % ashless rust inhibitor.

The composition was left at 100° C. for 16 weeks, in which the blending test samples 4, 5, 6, 7, 8, 9 shown no turbidity and precipitation, which indicates that the products FF-PAO100 and F-PAO100 effectively improve the solubility and dispersibility of the three types of functional additives in lubricating oil compositions.

The blending test samples 1, 2 and 3 showed trace turbidity and moderate flocculation. The appearance of turbidity and flocculation indicates insoluble phenomenon of the additives in the lubricating oil composition.

Through the anti-emulsification test of ASTM-D1401 for the above blending test samples, it was found that the lubricating oil composition prepared with FF-PAO100 and F-PAO100 can be completely separated from water within 8 minutes (in the formulation of the test sample apparently there is no demulsifier). This shows that the fluorinated PAO prepared by the method of the present invention has better water separation property.

In summary, through the addition reaction of the double bond at the terminal or other positions of the polyalphaolefin, the introduction of polar groups improves the compatibility of the polyalphaolefin with other additives, and a series of new halogen-containing synthetic base oils groups have been obtained with enhanced property of resistance to high-temperature, water, corrosion, radiation and wear.

The existing commercially available PAO-based base oils are non-polar, and when using additives, especially tackifying polymers, there have solubility problems, which have a great impact on the results of formulation. Through the addition reactions of the double bonds at the terminal or other positions of the polyalphaolefin, the introduction of polar groups improves the polarity of PAO, the solubility of additives, and thus the quality of the oils. By increasing the polarity of the lubricating oil, the firmness of the adsorbed oil film formed on the metal surface can be increased as the polarity of the molecules is increased, and the lubricating effect of the oils is enhanced as the film thickness is increased. The more polar the lubricating oil, the greater the solubility of the primary oxidation products and sludge in the oil and additives, and the lesser the sludge formation. At the same time, the increase in polar bond energy also provides activation points for bio-attack lubricant molecules, making them more easily biodegradable.

Although particular embodiments and examples have been described herein in detail, the above description has been done by way of example for purposes of illustration only, and is not intended to be limiting with respect to the scope of the invention. In particular, it is contemplated by the inventor that various substitutions, alterations, and modifications may be made to the invention without departing from the scope of the invention as claimed.

The invention claimed is:

1. A halogen-containing synthetic base oil, characterized in that the base oil contains FF-PAO and/or F-PAO, which are prepared from PAO as follows:

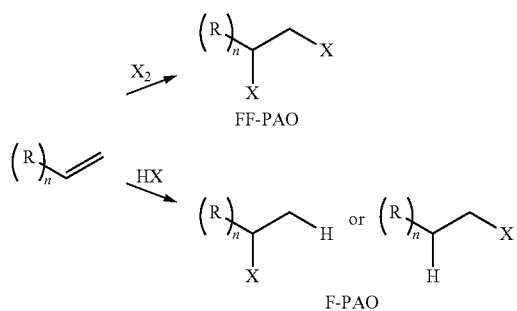

wherein:
PAO is

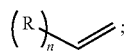

molecular weight of FF-PAO or F-PAO is 100-20000;
X is fluorine;
n is an integer of 2-30;
R is selected from the group consisting of:
1) A moiety of multi-branched polyethylene polymerized from ethylene, having a molecular weight of 100-20000,
2) a moiety of copolymer of ethylene and α-olefin with a chain length of 4-20 and a molecular weight of 100-20000, and
3) a moiety of polymer of isobutylene, having a molecular weight of 100-20000; wherein, FF-PAO or F-PAO is prepared by a step selected from the group consisting of:
adding fluorine at terminal double bonds or other double bonds of the poly-alpha-olefins,
adding fluorine at terminal double bonds or other double bonds of the polymer of monomeric alpha-olefins or mixed alpha-olefins,
adding fluorine at terminal double bonds or other double bonds of the multi-branched polyethylene polymerized from ethylene,
adding fluorine at terminal double bonds or other double bonds of the copolymer of ethylene and α-olefin, and
adding fluorine at terminal double bonds or other double bonds of the polymer of isobutylene.

2. The halogen-containing synthetic base oil according to claim 1, wherein n is an integer of 2-10.

3. A method of preparing the halogen-containing synthetic base oil of claim 1, comprising preparing FF-PAO and/or F-PAO from PAO as follows:

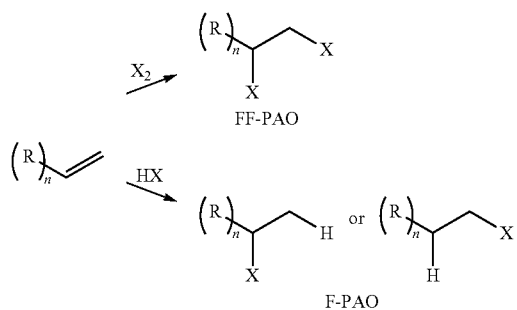

wherein:
PAO is

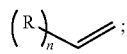

molecular weight of FF-PAO or F-PAO is 100-20000;
X is fluorine;
R is selected from the group consisting of:
1) A moiety of multi-branched polyethylene polymerized from ethylene, having a molecular weight of 100-20000,
2) a moiety of copolymer of ethylene and α-olefin with a chain length of 4-20 and a molecular weight of 100-20000, and
3) a moiety of polymer of isobutylene, having a molecular weight of 100-20000; wherein, preparation of FF-PAO or F-PAO is performed by a step selected from the group consisting of:
adding fluorine at terminal double bonds or other double bonds of the poly-alpha-olefins,
adding fluorine at terminal double bonds or other double bonds of the polymer of monomeric alpha-olefins or mixed alpha-olefins,
adding fluorine at terminal double bonds or other double bonds of the multi-branched polyethylene polymerized from ethylene,
adding fluorine at terminal double bonds or other double bonds of the copolymer of ethylene and α-olefin, and
adding fluorine at terminal double bonds or other double bonds of the polymer of isobutylene;
wherein, depending on electrophilic reaction conditions, resulting products are different as follows:
1) When fluorine is used, the resulting products are double fluorine substituted products FF-PAO, from fluorinating addition at terminal and alpha and non-terminal double bonds;
2) when hydrogen fluoride is used, the resulting products are single fluorine substituted products F-PAO, from fluorinating addition at alpha and beta positions and non-terminal double bonds.

4. A method of forming a composition of a lubricating oil from the halogen-containing synthetic base oil of claim 1, the method comprising:
providing the halogen-containing synthetic base oil and additives, and
mixing the halogen-containing synthetic base oil with the additives to form a composition to be used as a lubricating oil;
wherein the base oil has improved water separation property and higher compatibility with additives.

5. The method according to claim 4, wherein the additives are selected from the group consisting of:
(a) 0.4 wt % hindered phenol and diphenylamine antioxidants, with a feed ratio of 1:1;
(b) 1.5 wt % butylated triphenyl phosphate antifriction agent; and
(c) 0.1 wt % ashless rust inhibitor.

* * * * *